United States Patent
Beers et al.

(10) Patent No.: US 8,556,516 B2
(45) Date of Patent: Oct. 15, 2013

(54) COMPRESSOR BEARING COOLING INLET PLATE

(75) Inventors: Craig M. Beers, Wethersfield, CT (US); Seth E. Rosen, Middletown, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 440 days.

(21) Appl. No.: 12/868,967

(22) Filed: Aug. 26, 2010

(65) Prior Publication Data

US 2012/0051957 A1    Mar. 1, 2012

(51) Int. Cl.
*F16C 3/16* (2006.01)
*F04B 35/04* (2006.01)
*F01D 11/00* (2006.01)

(52) U.S. Cl.
USPC ....... 384/317; 384/321; 417/423.12; 415/110

(58) Field of Classification Search
USPC ......... 384/278, 313, 317, 320, 321, 465, 472, 384/605, 905; 310/52, 55, 58, 59, 60 R; 415/110–112; 416/174; 417/363, 407; 192/113.36, 113.5
IPC .............................. H02K 9/00, 9/02, 9/08, 9/10
See application file for complete search history.

(56) References Cited

U.S. PATENT DOCUMENTS

| | | | |
|---|---|---|---|
| 1,807,026 A * | 5/1931 | Brittain, Jr. | 384/469 |
| 4,378,134 A | 3/1983 | Eddy | |
| 5,676,230 A * | 10/1997 | Awaji et al. | 192/110 B |
| 6,232,683 B1 | 5/2001 | Hirai et al. | |
| 6,467,960 B1 | 10/2002 | Watson et al. | |
| 6,571,461 B2 | 6/2003 | Probst | |
| 6,909,581 B2 | 6/2005 | Gavit et al. | |
| 6,913,636 B2 | 7/2005 | Defrancesco et al. | |
| 7,342,332 B2 | 3/2008 | McAuliffe et al. | |
| 7,394,175 B2 | 7/2008 | McAuliffe et al. | |
| 7,648,279 B2 | 1/2010 | Struziak et al. | |
| 7,648,780 B2 | 1/2010 | Son et al. | |
| 2008/0259564 A1 * | 10/2008 | Kayama et al. | 361/695 |

* cited by examiner

*Primary Examiner* — Alan Waits
(74) *Attorney, Agent, or Firm* — Carlson, Gaskey & Olds, PC

(57) ABSTRACT

A compressor bearing cooling inlet plate has a mount plate, and a boss extending forwardly from the mount plate. The boss includes a plurality of grooves extending axially into the boss to define flow passages for cooling air from an outer peripheral surface of the cooling inlet plate to an inner bore. The grooves extend for a width between side walls, at angles that are not directly radially inwardly toward a center axis of the cooling plate. There is a plurality of widths across the plurality of grooves. A compressor bearing assembly, a motor driven compressor for use in a nitrogen generation system, and a method of installing a compressor bearing cooling inlet plate are all also disclosed and claimed.

22 Claims, 4 Drawing Sheets

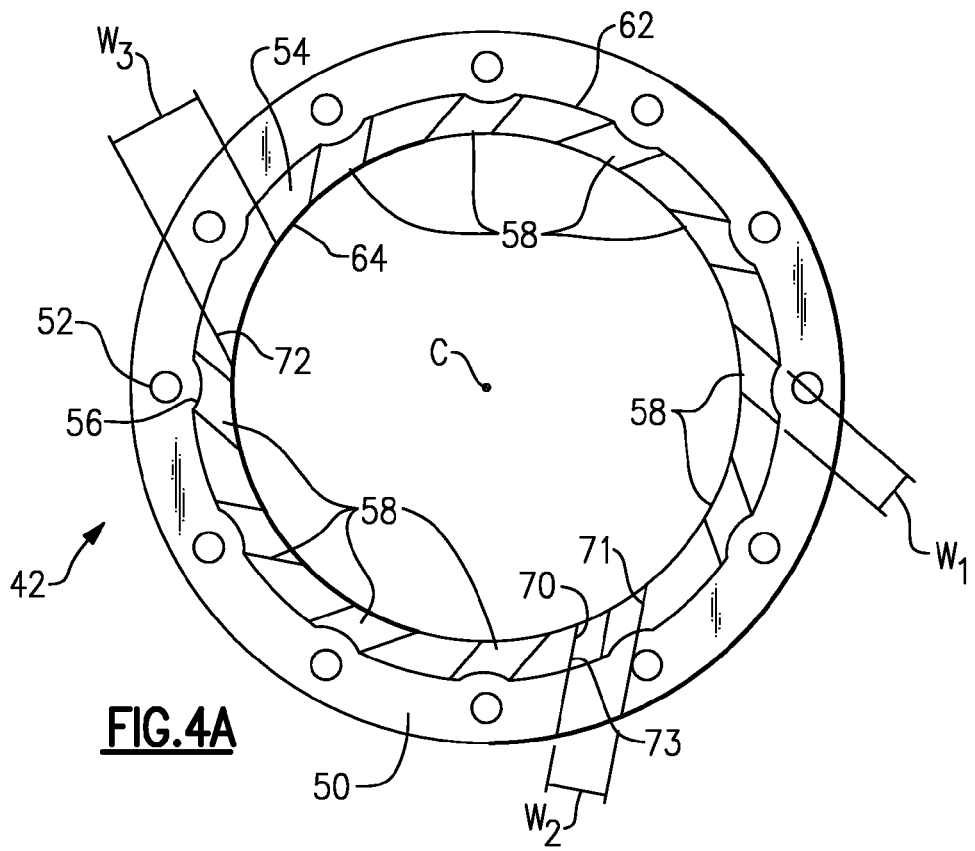
FIG.4A
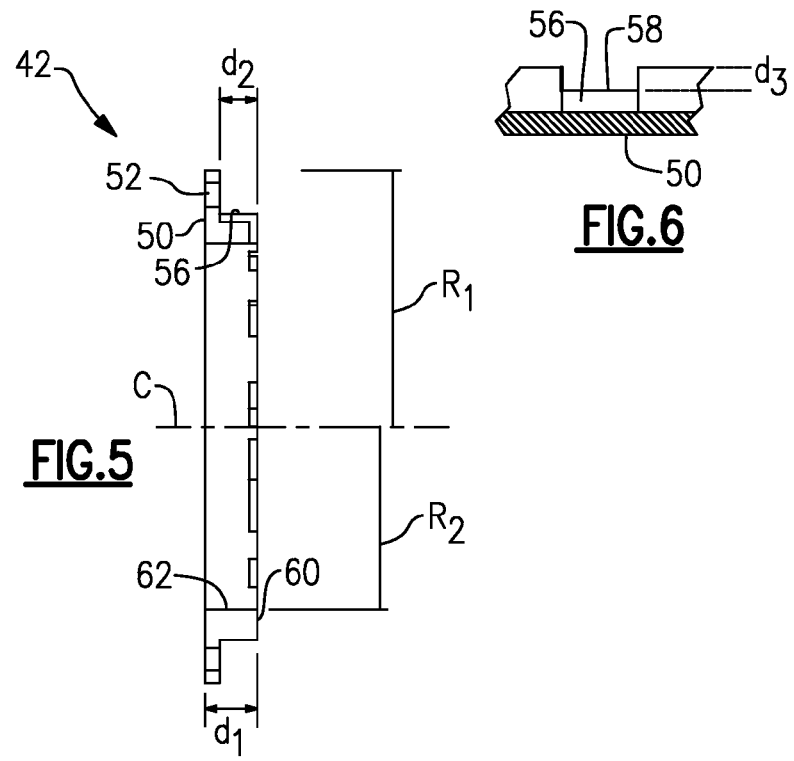
FIG.5
FIG.6

COMPRESSOR BEARING COOLING INLET PLATE

BACKGROUND

This application relates to a cooling plate for controlling the flow of air to an air bearing in a compressor.

Compressors are utilized in any number of applications. In one common type, a motor drives a shaft with opposed rotors to rotate.

One use of a compressor is in a nitrogen generation system such as utilized in an aircraft. Nitrogen is separated from air and used for applications such as reducing a risk of flame in a fuel tank.

In a compressor as utilized in a known nitrogen generation system, a single shaft drives two rotor stages, as mentioned above. A first of the rotors compresses the air and delivers it downstream to the second rotor. A portion of the compressed air from one of the rotors is tapped and delivered into a housing to provide air flow to a thrust bearing surface, and then to a radial air bearing surface.

In the prior art, the flow of this air has been relatively unguided.

SUMMARY

A compressor bearing cooling inlet plate has a mount plate, and a boss extending forwardly from the mount plate. The boss includes a plurality of grooves extending axially into the boss to define flow passages for cooling air from an outer peripheral surface of the cooling inlet plate to an inner bore. The grooves extend for a width between side walls, at angles that are not directly radially inwardly toward a center axis of the cooling plate. There is a plurality of widths across the plurality of grooves.

A compressor bearing assembly, a motor driven compressor for use in a nitrogen generation system, and a method of installing a compressor bearing cooling inlet plate are all also disclosed and claimed.

These and other features of the present invention can be best understood from the following specification and drawings, the following of which is a brief description.

BRIEF DESCRIPTION OF THE DRAWINGS

FIG. 4A is a front view of the cooling inlet plate.
FIG. 5 is a side view of the cooling inlet plate.
FIG. 6 is a sectional view of the cooling inlet plate.

DETAILED DESCRIPTION

Figure 1:
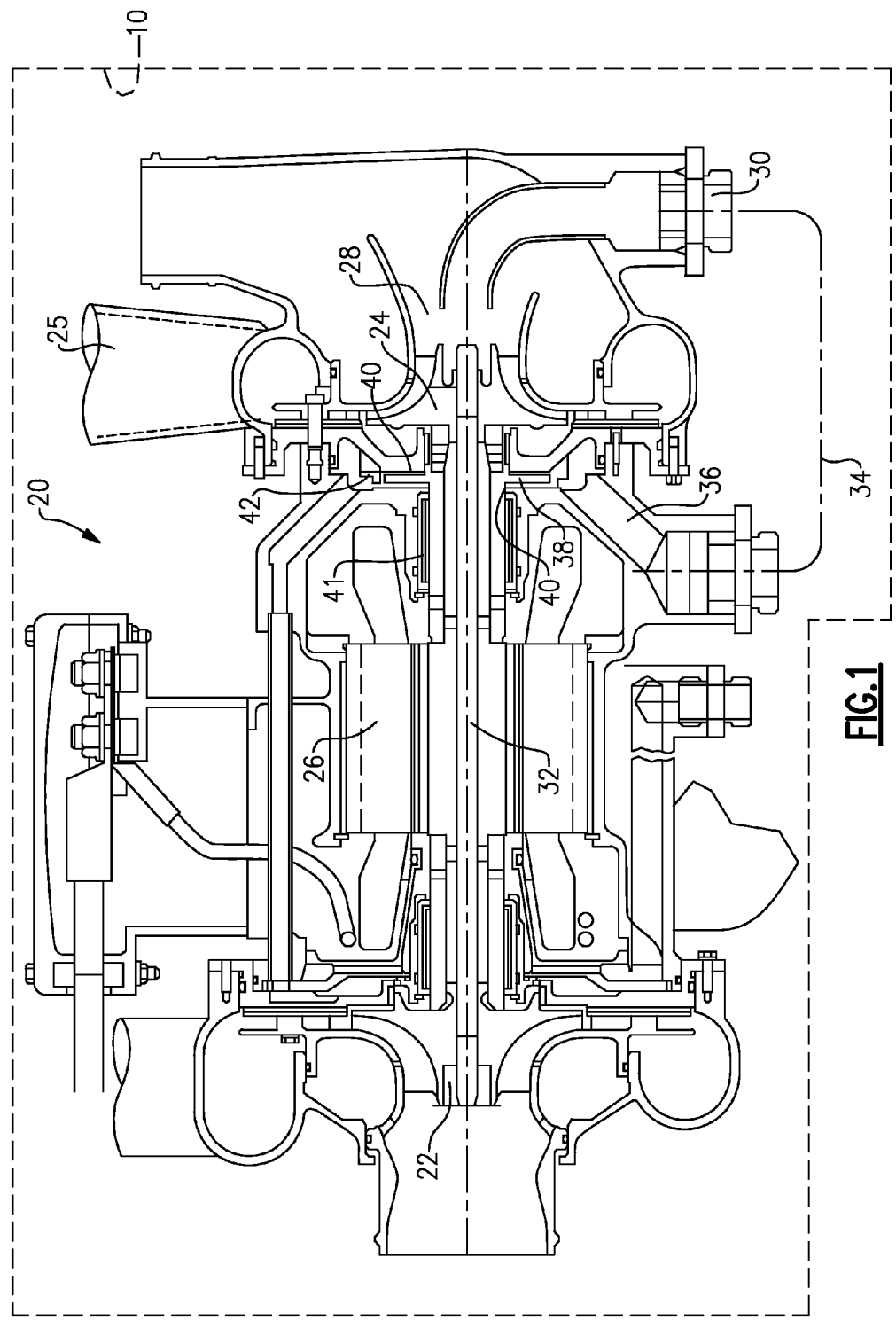
FIG. 1 is a cross-sectional view of a compressor.

A compressor 20, which is disclosed as being part of a nitrogen generation system, such as may be utilized on aircraft 10, includes a first stage rotor 22, which compresses air and delivers it downstream to a second stage rotor 24. The air is compressed by the second stage rotor 24 and delivered to an outlet 25. A motor 26 drives a shaft 32 to rotate the rotors 22 and 24. A bearing cooling tap 30 taps air from the second stage inlet 28, and through a passage 34 into a passage 36 leading to a pair of thrust bearing surfaces 40. The thrust-bearing surfaces 40 are associated with a cylindrical ring 38, which is driven to rotate with the shaft 32. Further, a journal bearing assembly 41 radially surrounds the shaft 32, and also receives air from the air flow passage 36. Essentially, air passes along the two thrust bearing surfaces 40, and then across the journal bearings 41.

Figure 2:
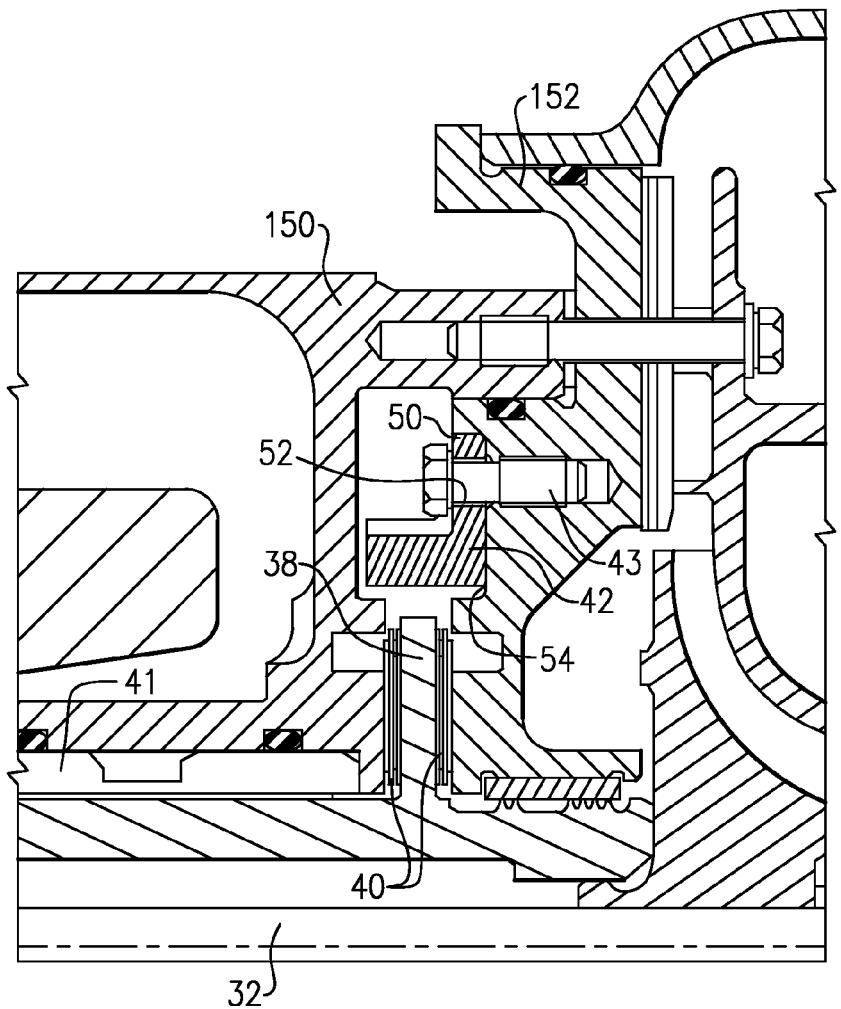
FIG. 2 shows a detail of the compressor.

A cooling inlet plate 42 is positioned radially outwardly of the cylindrical ring 38. As shown in FIG. 2, the cooling inlet plate 42 is bolted at 43 within a ditch 54 in the first housing 152. The cooling inlet plate 42 includes a mount plate 50 having bolt holes 52. A second housing portion 150 is secured to housing 152. The thrust bearing surfaces 40 are defined between the cylindrical ring 38, and surfaces of the housings 150 and 152.

To assemble the compressor, the cylindrical ring 38 is formed on the shaft 32 and positioned between two housing surfaces 150, 152. The shaft is placed within journal bearings 41. The air supply is connected for delivering air to a location radially outwardly of the cylindrical ring 38 to pass air along the thrust bearing surfaces 40 defined between the cylindrical ring 38 and housings 150, 152, and then between the shaft 32 and the journal bearings 41. The cooling inlet plate 42 is bolted to the housing radially outwardly of the cylindrical ring 38. As is clear, the cooling inlet plate 42 is positioned in a chamber defined between the housing portions, and the compressor rotor 24 is outwardly of that chamber, and on an opposed side of one of the housing portions relative to the cooling inlet plate 42.

Figure 3:
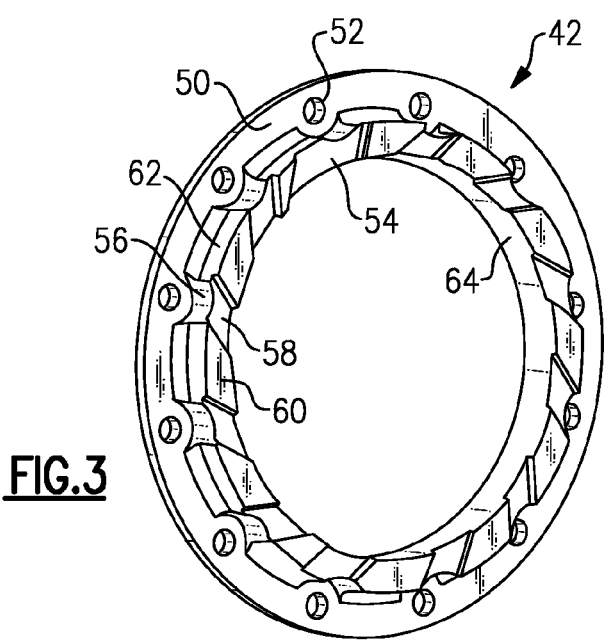
FIG. 3 shows a cooling inlet plate.

As shown in FIG. 3, the cooling inlet plate 42 has a mount plate 50 that extends for a relatively axially small depth along a rotational axis of the shaft 32. An extending boss 54 is provided with notches 56 in an outer peripheral surface 62 of boss 54 that are generally formed on a radius from a center of each bolt hole 52, and which feed into a groove 58. The grooves 58 are spaced between nominal surface portions 60 of boss 54.

The notches 56 and grooves 58 together act to guide the air flow from radially outwardly of the boss portion 54 to a radially inner bore 64, and hence to the thrust bearing surfaces 40.

As can be appreciated from FIG. 4A, there are twelve grooves 58, 72, and 73. In one embodiment, ten of the grooves, grooves 58, extend for a relatively small distance or width, measured between side walls 70 and 71, and by a distance measured perpendicular to the side walls. The ten relatively small grooves 58 extend for a width $W_1$. In one embodiment, $W_1$ was 0.28" (0.711 cm). Grooves 73 extend for a width $W_2$. In one embodiment, $W_2$ was 0.385" (0.978 cm). The groove 72 extends for a width $W_3$. In the embodiment, the width $W_3$ was 0.630" (1.60 cm).

In embodiments, a ratio of $W_1$ to $W_3$ is selected to be between 0.420 and 0.470. A ratio of $W_2$ to $W_3$ is selected to be between 0.580 and 0.640. Centers of the twelve bolt holes 52 are all spaced by 30° in this embodiment.

As can be appreciated, the twelve grooves 58, 72, and 73, extend at angles relative to the outer peripheral surface 62 of the boss 54, and to an inner peripheral surface 64. The angles vary across the twelve grooves, as is apparent from FIG. 4A. As is also apparent from FIG. 4A, the angles upon which the grooves 58, 72, and 73 extend, are not directly radially inward toward a center C of the cooling inlet plate 42.

Figure 4B:
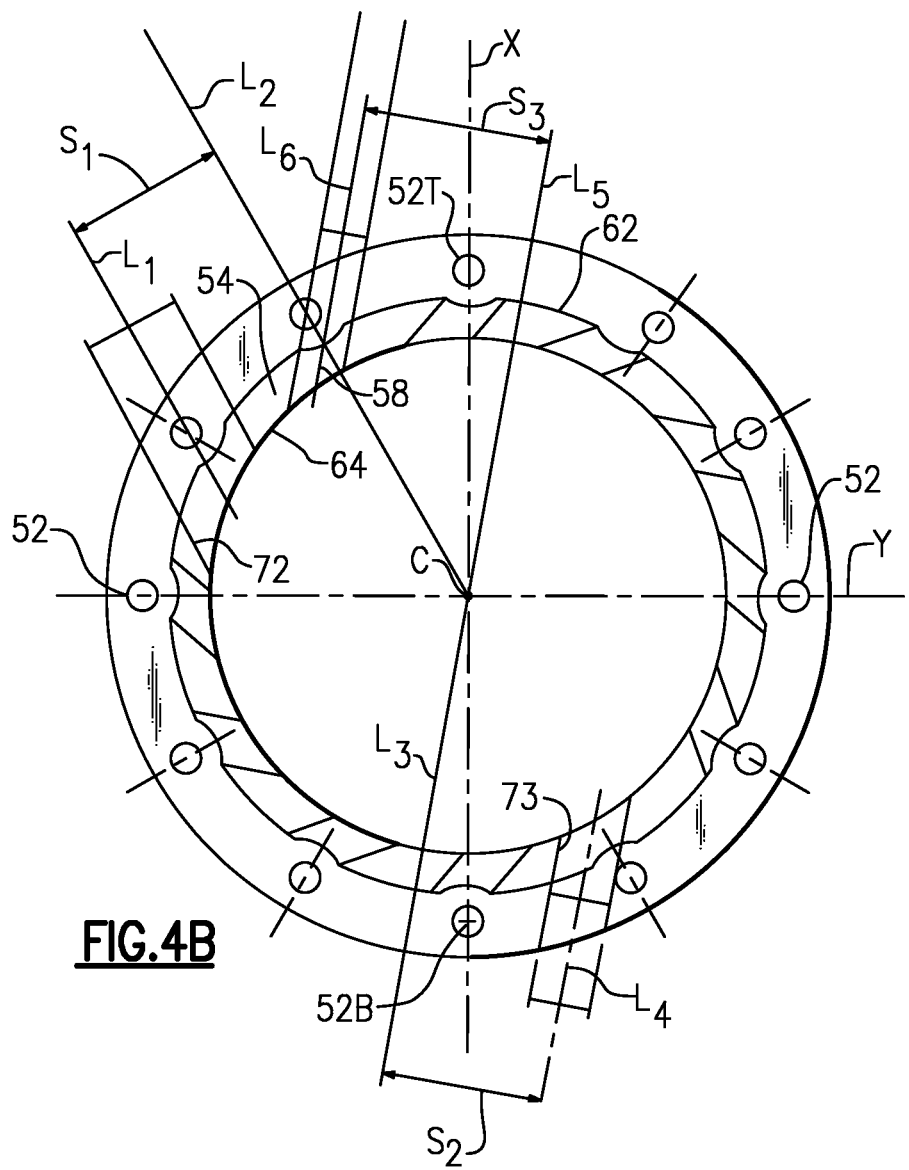
FIG. 4B shows the generation of certain angles associated with the cooling inlet plate.

One embodiment for generating the angles along which the grooves 58, 72, and 73 are formed will now be disclosed with reference to FIG. 4B. Initially, X and Y axes are selected as shown in FIG. 4B. Bolt holes 52T and 52B are centered on the X axis, and two other bolt holes 52 are centered on the Y axis. The four bolt holes associated with the axes will eventually be associated with one of the ten equal width grooves 58.

To generate the groove 72, a pair of lines $L_1$ and $L_2$ are defined. $L_2$ is a radius extending at a location spaced 30° from X in a counterclockwise direction. $L_1$ is defined parallel to $L_2$ and spaced by a distance $S_1$. In one embodiment, $S_1$ was 0.98" (2.48 cm). Then, $L_1$ defines the center of the groove 72, and thus the angle through which the groove 72 extends.

To define the groove 73, a radius $L_3$ is defined spaced 10° from the X axis, and from the center of the bolt hole 52B. Then, a line $L_4$ is defined which again is parallel to the radius $L_3$. The line $L_4$ is drawn at a distance S2, in one embodiment 1.00" (2.54 cm), from the radius $L_3$. The line $L_4$ then serves as the center of the groove 73.

The ten grooves 58 are defined by initially defining lines $L_5$ and $L_6$. $L_5$ is a radius selected to be 10° from the X axis, and clockwise. $L_6$ is defined as a line parallel to $L_5$, and spaced by a distance $S_3$. $S_3$ is 1.13" (2.87 cm_) in one embodiment. $L_6$ forms the center of the groove 58. The other grooves 58 are defined by rotating 30° from this initial groove 58. The grooves which would align with the location of the bolt holes associated with grooves 72 and 73 are defined only as generation points, and are not formed into the final cooling plate. Of course, other distances may be utilized.

Thus, three different strategies are utilized to generate the grooves. A first strategy is utilized for the groove 72, a second strategy is utilized for the groove 73, and a third strategy is utilized for the ten other slots 58.

FIG. 5 shows a cross-sectional view of the cooling plate 42. A distance $d_1$ can be defined between the rear side of the mount plate 50, and to a forward end of the surface 60. In one embodiment, $d_1$ was 0.430" (1.09 cm). A distance $d_2$ can be defined as the axial distance of the boss 54, and from a forward side of the mount plate 50, to the forward end of the nominal surface 60. In one embodiment, $d_2$ was 0.310" (0.787 cm). In embodiments, a ratio of $d_1$ to $d_2$ was between 0.68 and 0.76.

As shown in FIG. 6, a distance d3 can be defined as the depth of the grooves 58, 72, and 73. In one embodiment, d3 was 0.060" (0.152 cm). In embodiments, a ratio of d2 to d3 was between 4.60 and 5.82. As can be appreciated, $d_1$ $d_2$ and $d_3$ are all measured in a direction parallel to each other.

As also shown, a radius $R_1$ to the outer peripheral surface of the mount plate 50 was 2.186" (5.55 cm). A radius $R_2$ to the inner bore of the mount plate was 1.5625" (3.97 cm).

A ratio of $d_3$ to $R_2$ was between 0.034 and 0.042.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A compressor bearing cooling inlet plate comprising:
    a cooling plate body including a mount plate, and a boss extending axially forwardly from said mount plate, said boss including a plurality of grooves extending axially into said boss to define flow passages for cooling air from an outer peripheral surface of the cooling plate body to an inner bore of the cooling plate body, said grooves each extending for a width between side walls, and said grooves extending at angles which are not directly radially inwardly toward a center axis of said cooling plate body, and there being a plurality of widths across said plurality of grooves; and
    said mount plate and said boss together extending for a first axial distance, said boss extending for a second axial distance, and a depth of said plurality of grooves axially into said boss defining a third axial distance, and a ratio of said first axial distance to said second axial distance being between 0.6 and 0.76, and a ratio of said second axial distance to said third axial distance being between 4.60 and 5.82.

2. The compressor bearing cooling inlet plate as set forth in claim 1, wherein there are a first plurality of grooves having a first width, and a second plurality of grooves having widths which are greater than said first width and there being more grooves in said first plurality than in said second plurality.

3. The compressor bearing cooling inlet plate as set forth in claim 2, wherein there are twelve of said grooves, with said first plurality including ten of said twelve grooves, and said second plurality including the other two of said grooves.

4. The compressor bearing cooling inlet plate as set forth in claim 3, wherein in said second plurality, there are two distinct widths, including a second and third width, with a ratio of said first width to the third width being between 0.420 and 0.470.

5. The compressor bearing cooling inlet plate as set forth in claim 4, wherein a ratio of the second width to the third width being between 0.580 and 0.640.

6. A compressor bearing assembly comprising:
    a compressor rotor attached to be driven by a shaft, said shaft carrying a cylindrical ring, said cylindrical ring to be positioned between two adjacent housing surfaces of a housing to define thrust bearing surfaces;
    at least one journal bearing for supporting said shaft within the housing;
    a cooling inlet plate being positioned radially outwardly of said cylindrical ring, said cooling inlet plate having a plurality of grooves for delivering air from an outer peripheral surface of said cooling air plate to an inner peripheral surface and such that the air flows across the thrust bearing surfaces and then the journal bearing; and
    said compressor rotor being received on an opposed side of one of said two adjacent housing surfaces relative to said cylindrical ring.

7. The compressor bearing assembly as set forth in claim 6, wherein said grooves extends along angles that are not directly radially inwardly toward a rotational axis of said shaft.

8. The compressor bearing assembly as set forth in claim 7, wherein a cooling plate body includes a mount plate, and having a boss extending axially forwardly from said mount plate, said boss including the plurality of grooves extending axially into of said boss to define flow passages for the cooling air from the outer peripheral surface of the cooling plate body to an inner bore of the cooling plate body, said grooves extending for a width between side walls, and there being a plurality of widths between said plurality of grooves.

9. The compressor bearing assembly as set forth in claim 8, said mount plate and said boss together extending for a first axial distance, said boss extending for a second axial distance, and a depth of said plurality of grooves axially into said boss defining a third axial distance, and a ratio of said first axial distance to said second axial distance being between 0.6 and 0.76, and a ratio of said second axial distance to said third axial distance being between 4.60 and 5.82.

10. The compressor bearing assembly as set forth in claim 8, wherein there are a first plurality of grooves having a first width, and a second plurality of grooves having widths which are greater than said first width and there being more grooves in said first plurality than in said second plurality.

11. The compressor bearing assembly as set forth in claim 10, wherein there are twelve of said grooves, with said first plurality including ten of said twelve grooves, and said second plurality including the other two of said grooves.

12. The compressor bearing assembly as set forth in claim 11, wherein in said second plurality, there are two distinct widths, including a second and third width, with a ratio of said first width to the third width being between 0.420 and 0.470.

13. The compressor bearing assembly as set forth in claim 12, wherein a ratio of the second width to the third width being between 0.580 and 0.640.

14. A nitrogen generation system motor driven compressor comprising:
   a compressor rotor attached to be driven by a shaft, said shaft being driven by a motor, and a housing enclosing said rotor, said shaft and said motor, said shaft carrying a cylindrical ring positioned between two adjacent surfaces of said housing to define thrust bearing surfaces;
   at least one journal bearing for supporting said shaft within the housing;
   a cooling inlet plate being positioned radially outwardly of said cylindrical ring, said cooling inlet plate having a plurality of grooves for delivering air from an outer peripheral surface of said cooling air plate to an inner peripheral surface and such that the air flows across the thrust bearing surfaces and then the journal bearing; and
   said compressor rotor being received on an opposed side of one of said two adjacent surfaces relative to said cylindrical ring.

15. The compressor as set forth in claim 14, wherein said grooves extends along angles that are not directly radially inwardly toward a rotational axis of said shaft.

16. The compressor as set forth in claim 15, wherein a cooling plate body includes a mount plate, and having a boss extending axially forwardly from said mount plate, said boss including the plurality of grooves extending axially into of said boss to define flow passages for the cooling air from the outer peripheral surface of the cooling plate body to an inner bore of the cooling plate body, said grooves extending for a width between side walls, and there being a plurality of widths between said plurality of grooves.

17. The compressor as set forth in claim 16, said mount plate and said boss together extending for a first axial distance, said boss extending for a second axial distance, and a depth of said plurality of grooves axially into said boss defining a third axial distance, and a ratio of said first axial distance to said second axial distance being between 0.6 and 0.76, and a ratio of said second axial distance to said third axial distance being between 4.60 and 5.82.

18. The compressor as set forth in claim 16, wherein there are a first plurality of grooves having a first width, and a second plurality of grooves having widths which are greater than said first width and there being more grooves in said first plurality than in said second plurality.

19. The compressor as set forth in claim 18, wherein there are twelve of said grooves, with said first plurality including ten of said twelve grooves, and said second plurality including the other two of said grooves.

20. The compressor as set forth in claim 19, wherein in said second plurality, there are two distinct widths, with a ratio of said first width to a third larger width being between 0.420 and 0.470, and a ratio of the two widths in said second plurality being between 0.580 and 0.640.

21. A method of installing an air bearing into a compressor comprising the steps of:
   (a) mounting a cylindrical ring on a motor driven shaft for a compressor rotor, and positioning said cylindrical ring between two housing surfaces, which define thrust bearing surfaces said compressor rotor being received on an opposed side of one of said two adjacent housing surfaces relative to said cylindrical ring and connecting an air supply for delivering air to a location radially outwardly of said cylindrical ring to pass the air along the thrust bearing surfaces; and
   (b) positioning a cooling inlet plate radially outwardly of the cylindrical ring, said cooling inlet plate being formed to have a plurality of grooves for directing the air from a radially outer surface on said cooling inlet plate to an inner bore on said cooling inlet plate, said plurality of grooves directing the air along a plurality of angles which are not radially inward toward a rotational axis of the shaft.

22. The method as set forth in claim 21, wherein a cooling plate body includes a mount plate, and having a boss extending axially forwardly from said mount plate, said boss including the plurality of grooves extending axially into of said boss to define flow passages for the cooling air from the outer peripheral surface of the cooling plate body to said inner bore of the cooling plate body, said plurality of grooves extending for a width between side walls, and there being a plurality of widths between said plurality of grooves; and
   said mount plate and said boss together extending for a first axial distance, said boss extending for a second axial distance, and a depth of said plurality of grooves axially into said boss defining a third axial distance, and a ratio of said first axial distance to said second axial distance being between 0.6 and 0.76, and a ratio of said second axial distance to said third axial distance being between 4.60 and 5.82.

* * * * *